United States Patent
Saxena et al.

(10) Patent No.: US 10,598,151 B2
(45) Date of Patent: Mar. 24, 2020

(54) SYSTEM AND METHOD FOR MICROSITING A WIND FARM FOR LOADS OPTIMIZATION

(71) Applicant: General Electric Company, Schenectady, NY (US)

(72) Inventors: Vikas Saxena, Bangalore (IN); Srinivasa Reddy Gujju, Bangalore (IN)

(73) Assignee: General Electric Company, Schenectady, NY (US)

(*) Notice: Subject to any disclaimer, the term of this patent is extended or adjusted under 35 U.S.C. 154(b) by 623 days.

(21) Appl. No.: 15/165,019

(22) Filed: May 26, 2016

(65) Prior Publication Data
US 2017/0342961 A1 Nov. 30, 2017

(51) Int. Cl.
*F03D 7/04* (2006.01)
*F03D 9/25* (2016.01)
(Continued)

(52) U.S. Cl.
CPC .......... *F03D 7/048* (2013.01); *F03D 9/257* (2017.02); *F03D 13/00* (2016.05); *F03D 17/00* (2016.05);
(Continued)

(58) Field of Classification Search
CPC .......... F03D 13/00; F03D 17/00; F03D 7/048; F03D 80/00; F03D 9/257; F05B 2260/84;
(Continued)

(56) References Cited
U.S. PATENT DOCUMENTS 6,320,272 B1* 11/2001 Lading ............. F03D 7/0224
290/44
6,688,841 B1* 2/2004 Wobben ........... F03D 7/0224
415/1
(Continued)

FOREIGN PATENT DOCUMENTS

CN 103942608 A 7/2014
EP 2 128 441 A2 12/2009
(Continued)

OTHER PUBLICATIONS

"Research on Turbulence Intensity as an Evaluation Index for Micrositing Validation" Zhang et al 2010 IEEE, pp. 1-4 (Year: 2010).*
(Continued)

*Primary Examiner* — Aniss Chad
(74) *Attorney, Agent, or Firm* — Dority & Manning, P.A.

(57) ABSTRACT

The present disclosure is directed to a system and method for micrositing a wind farm having a plurality of wind turbines. The method includes (a) determining, via a loads optimization function, one or more wind directions with or without turbine shadow for each of the wind turbines in the wind farm, (b) determining, via the loads optimization function, at least one additional wind parameter for each of the wind directions, (c) calculating, via simulation, loads for each of the wind turbines in the wind farm based on the identified wind directions with or without turbine shadow for each of the wind turbines in the wind farm and the at least one additional wind parameter for each of the wind directions, and (d) determining a site layout for the wind farm based on the calculated loads.

13 Claims, 8 Drawing Sheets

(51) Int. Cl.
*F03D 80/00* (2016.01)
*F03D 13/00* (2016.01)
*F03D 17/00* (2016.01)
*G05B 17/02* (2006.01)
*G05B 19/048* (2006.01)

(52) U.S. Cl.
CPC .............. *F03D 80/00* (2016.05); *G05B 17/02* (2013.01); *G05B 19/048* (2013.01); *F05B 2260/84* (2013.01); *F05B 2270/20* (2013.01); *F05B 2270/3201* (2013.01); *F05B 2270/321* (2013.01); *F05B 2270/331* (2013.01); *G05B 2219/2619* (2013.01); *Y02E 10/725* (2013.01)

(58) Field of Classification Search
CPC .......... F05B 2270/20; F05B 2270/3201; F05B 2270/321; F05B 2270/331; G05B 17/02; G05B 19/048; G05B 2219/2619; Y02E 10/725
See application file for complete search history.

(56) References Cited

U.S. PATENT DOCUMENTS

| | | | |
|---|---|---|---|
| 8,050,899 | B2 | 11/2011 | Giguere et al. |
| 8,239,071 | B2 | 8/2012 | Lausen |
| 2007/0299548 | A1* | 12/2007 | Weitkamp ............... F03D 7/046 700/52 |
| 2008/0317598 | A1* | 12/2008 | Barbu ..................... F03D 7/022 416/9 |
| 2009/0099702 | A1 | 4/2009 | Vyas et al. |
| 2009/0192868 | A1* | 7/2009 | Rajiv ................. G06Q 10/0639 705/7.38 |
| 2009/0295165 | A1* | 12/2009 | Giguere ................. G06Q 10/06 290/55 |
| 2010/0060001 | A1* | 3/2010 | Gabrys ................... F03D 3/005 290/44 |
| 2010/0138201 | A1* | 6/2010 | Gundling ............... F03D 7/043 703/9 |
| 2010/0283245 | A1 | 11/2010 | Gjerlov et al. |
| 2012/0093627 | A1* | 4/2012 | Christenson .......... F03D 1/0675 415/1 |
| 2013/0103203 | A1 | 4/2013 | Masuda et al. |
| 2013/0166082 | A1 | 6/2013 | Ambekar et al. |
| 2013/0320676 | A1* | 12/2013 | Kim ........................ F03D 7/043 290/44 |
| 2014/0207296 | A1 | 7/2014 | Kjaer et al. |
| 2014/0271187 | A1* | 9/2014 | Baker ....................... F03D 7/04 416/1 |
| 2016/0171401 | A1* | 6/2016 | Wu .................. G06Q 10/06312 705/7.22 |
| 2016/0230741 | A1* | 8/2016 | Brath .................... F03D 7/0224 |
| 2016/0333854 | A1* | 11/2016 | Lund ...................... F03D 7/047 |
| 2017/0022974 | A1* | 1/2017 | Roma .................... F03D 17/00 |
| 2017/0342961 | A1* | 11/2017 | Saxena .................. F03D 17/00 |
| 2018/0030955 | A1* | 2/2018 | Vaddi ..................... F03D 9/002 |
| 2018/0247000 | A1* | 8/2018 | Vestol Endrerud .... G06Q 50/28 |

FOREIGN PATENT DOCUMENTS

EP 2128441 A2 * 12/2009 ............ G06Q 10/06
WO WO2015120856 A1 8/2015

OTHER PUBLICATIONS

Frohboese, P., et al., "Thrust coefficients used for estimation of wake effects for fatigue load calculation," European Wind Energy Conference, pp. 1-10 (Jan. 1, 2010).

Meissner, C., et al., "Park optimization using IEC constraints fo wind quality-Strand Horn," Europe's Premier Wind Energy Event, pp. 1 (Jan. 2011).

Zhang, Z., et al., "Research on turbulence intensity as an evaluation index for micrositing validation," World Non-Grid-Connected Wind Power and Energy Conference (WNWEC), pp. 64-67 (Nov. 5-7, 2010).

Extended European Search Report and Opinion issued in connection with corresponding EP Application No. 17172529.4 dated Oct. 10, 2017.

* cited by examiner

SYSTEM AND METHOD FOR MICROSITING A WIND FARM FOR LOADS OPTIMIZATION

FIELD OF THE INVENTION

The present invention relates generally to wind turbines, and more particularly, to systems and methods for micrositing a wind farm for loads optimization.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and a blade root of the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

A plurality of wind turbines are commonly used in conjunction with one another to generate electricity and are commonly referred to as a "wind farm." Wind turbines on a wind farm typically include their own meteorological monitors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm is commonly provided. The correlation of meteorological data with power output allows the empirical determination of a "power curve" for the individual wind turbines.

Traditionally, wind farms are controlled in a decentralized fashion to generate power such that each turbine is operated to maximize local energy output and to minimize impacts of local fatigue and extreme loads. To this end, each turbine includes a control module, which typically attempts to maximize power output of the turbine in the face of varying wind and grid conditions, while satisfying constraints like sub-system ratings and component loads. Based on the determined maximum power output, the control module controls the operation of various turbine components, such as the generator/power converter, the pitch system, the brakes, and the yaw mechanism to reach the maximum power efficiency.

Amplified wind power demand and customer desire of extracting maximum energy from a wind farm has driven the production of wind turbines having a larger rotor diameter. Such rotor diameters improve energy production of individual wind turbines, but introduce new challenges such as higher fatigue loads. One of the contributing factors to higher fatigue loads is the collective impact of turbine shadow from the increased number of nearby turbines in one or more wind direction(s). Often, these higher fatigue loads exceed nominal/design loads for the turbine model and give few options for developers. More specifically, farm developers must either relocate the turbine(s) or reduce turbine operation in one or more wind direction(s). Thus, since most micrositing techniques do not account for fatigue load calculations because of the complexity involved and extensive computational requirements, developers end up either with opting suboptimal location(s) with low energy production or loads infeasible location(s) for one or more turbine(s) in the wind farm layout.

Accordingly, common practice is to build the wind farm with a suboptimal layout and opt for post-installation techniques to improve the turbine(s) performance. Such post-installation techniques generally calculate the optimal value(s) of one or more turbine operating parameter(s) based on measured values of one or more site parameter(s). The disadvantages of these available post-installation techniques include but are not limited to: (1) additional investment by the wind farm owner, (2) farm-level operation that requires suboptimal performance by one or more wind turbine(s) in the wind farm to improve the performance of other turbines, (3) trivial annual energy production (AEP) benefits from suboptimal site conditions at one or more turbine location(s), (4) predefined strategies or set optimal values of wind turbine operating parameters in one or more wind directions obtained from simulation by comparing the expected loads to the design/nominal loads, and/or (5) time-consuming implementation and/or validation.

Accordingly, an improved system and method for micrositing a wind farm for loads optimization that does not require such post-installations techniques would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for micrositing a wind farm having a plurality of wind turbines. The method includes (a) determining, via a loads optimization function, one or more wind directions with or without turbine shadow for each of the wind turbines in the wind farm, (b) determining, via the loads optimization function, at least one additional wind parameter for each of the wind directions, (c) calculating, via simulation, loads for each of the wind turbines in the wind farm based on the identified wind directions with or without turbine shadow for each of the wind turbines in the wind farm and the at least one additional wind parameter for each of the wind directions, and (d) determining a site layout for the wind farm based on the calculated loads.

In one embodiment, the method may include recalculating the loads for each of the wind turbines after determining the site layout to ensure the loads are below a predetermined threshold. More specifically, in certain embodiments, the predetermined threshold may correspond to one or more design load values for one or more wind turbine components plus a safety factor.

In another embodiment, the method may include repeating steps (a) through (d) if the recalculated loads for one or more of the wind turbines in the wind farm exceed the predetermined threshold.

In further embodiments, the additional wind parameter(s) may include, for example, a cutout wind speed.

In additional embodiments, the method may further include identifying at least one of the following: one or more sensor locations for load sensors on each of the wind turbines, neighboring turbines for each of the wind turbines, or a wind speed distribution of the wind farm. Thus, in certain embodiments, the method may also include calculating the loads for each of the wind turbines in the wind farm as a function of at least one of the sensor locations, the neighboring turbines, or the wind speed distribution.

In another embodiment, the method may include comparing cumulative loads in one or more wind directions with design loads of a turbine model of each of the wind turbines in the wind farm and calculating the loads of each of the wind turbines in the wind farm as a function of the comparison.

In further embodiments, the method may include defining a predetermined site layout of the wind farm and calculating loads for one or more wind turbines in the wind farm having the predetermined site layout as a function of one or more wind conditions at the wind farm. In additional embodiments, the method may include initially providing the predetermined site layout to a user if the loads for all of the wind turbines in the wind farm are initially less than the predetermined threshold. Further, in certain embodiments, the wind condition(s) may include at least one of wind direction, turbine shadow, turbulence intensity, or wind speed distributions in respective wind directions.

In another aspect, the present disclosure is directed to a system for micrositing a wind farm having a plurality of wind turbines. The system includes a controller having at least one processor. The processor includes a loads optimization loop stored therein. Further, the loads optimization loop is configured to implement a loads optimization function. More specifically, the loads optimization function includes (a) determining one or more wind directions with or without turbine shadow for each of the wind turbines in the wind farm, (b) determining at least one additional wind parameter for each of the wind directions, (c) calculating loads for each of the wind turbines in the wind farm based on the identified wind directions with or without turbine shadow for each of the wind turbines in the wind farm and the at least one additional wind parameter for each of the wind directions, (d) determining a site layout for the wind farm based on the calculated loads, and (e) recalculating the loads for each of the wind turbines in the wind farm to ensure the loads are below a predetermined threshold. It should be understood that the system may further include any of the additional features as described herein.

In yet another aspect, the present disclosure is directed to a method for micrositing a wind farm having a plurality of wind turbines via a loads optimization function. The method includes defining a predetermined layout of the wind farm, calculating loads for one or more wind turbines in the wind farm having the predetermined layout as a function of one or more wind conditions at the wind farm and if the loads for one or more of the wind turbines in the wind farm are greater than a predetermined threshold, implementing a load optimization function. The loads optimization function includes (a) determining one or more wind directions with or without turbine shadow for each of the wind turbines in the wind farm, (b) determining at least one additional wind parameter for each of the wind directions, (c) updating the predetermined layout based on the one or more wind directions with or without turbine shadow for each of the wind turbines in the wind farm and the at least one additional wind parameter for each of the wind directions, and (d) recalculating the loads for each of the wind turbines in the wind farm for the predetermined layout to ensure the loads are below a predetermined threshold. It should be understood that the method may further include any of the additional steps and/or features as described herein.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
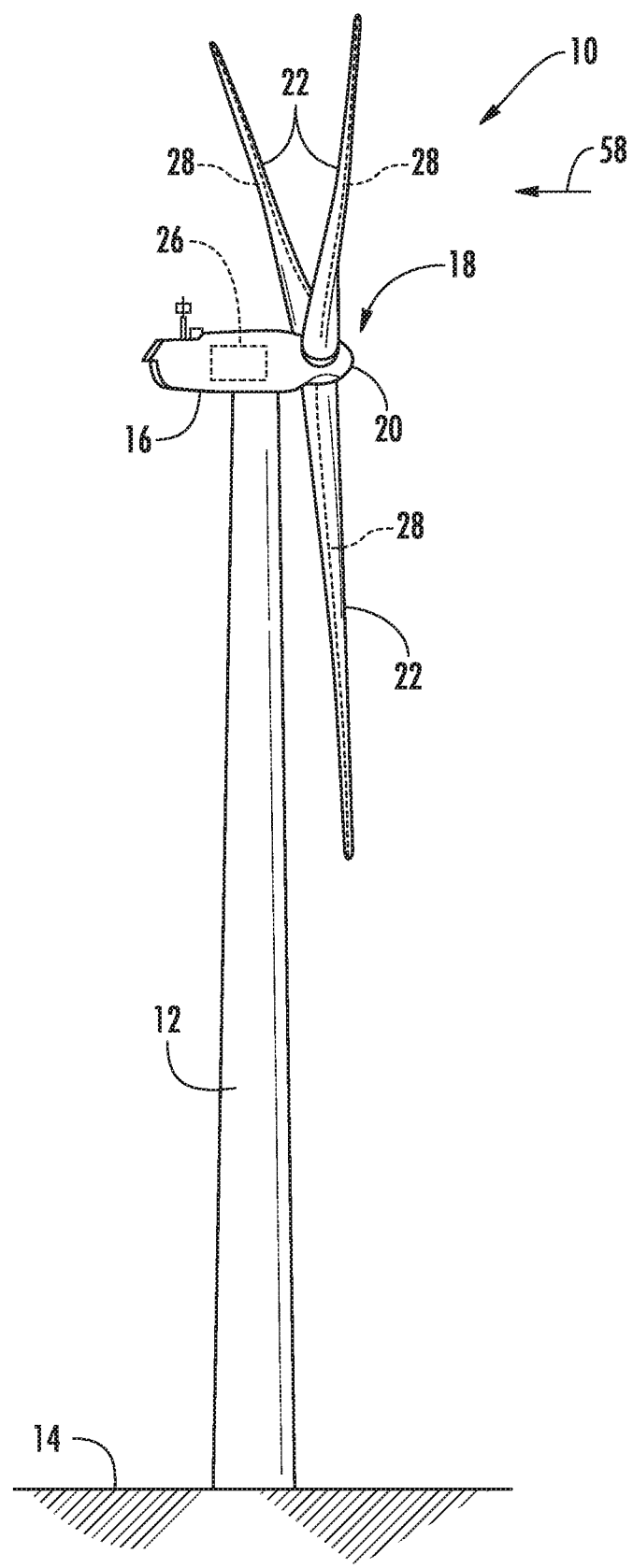
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for micrositing a wind farm for loads optimization. Thus, the present disclosure is configured to place the wind turbines of the wind farm at energetic wind locations and optimize turbine operation to keep the turbine component loads within design limits. Using the method described herein, wind turbines of larger rotor diameter can be placed in a wind farm with optimal operation and neighboring turbines can capture more AEP without exceeding loads. As such, disadvantages associated with post-installation techniques can be minimized. More specifically, while optimizing the loads for the operation of a wind turbine in one or more wind direction(s) for the turbine shadow from neighboring turbine(s), it is advantageous to compare the cumulative fatigue loads on the wind turbine in all the directions with the design fatigue loads of a turbine model. The weighted impact of an individual or multiple turbine(s) shadow in different sectors can also be considered in the loads optimization method of the present disclosure. More specifically, a loads optimization function is utilized for weighing the impact of turbine(s) shadow in the different direction(s) such that turbine operation can be optimized to meet the design fatigue loads of the wind turbine. Thus, the present disclosure optimizes turbine operation in different wind directions to keep the fatigue loads for turbine design life within nominal limit.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
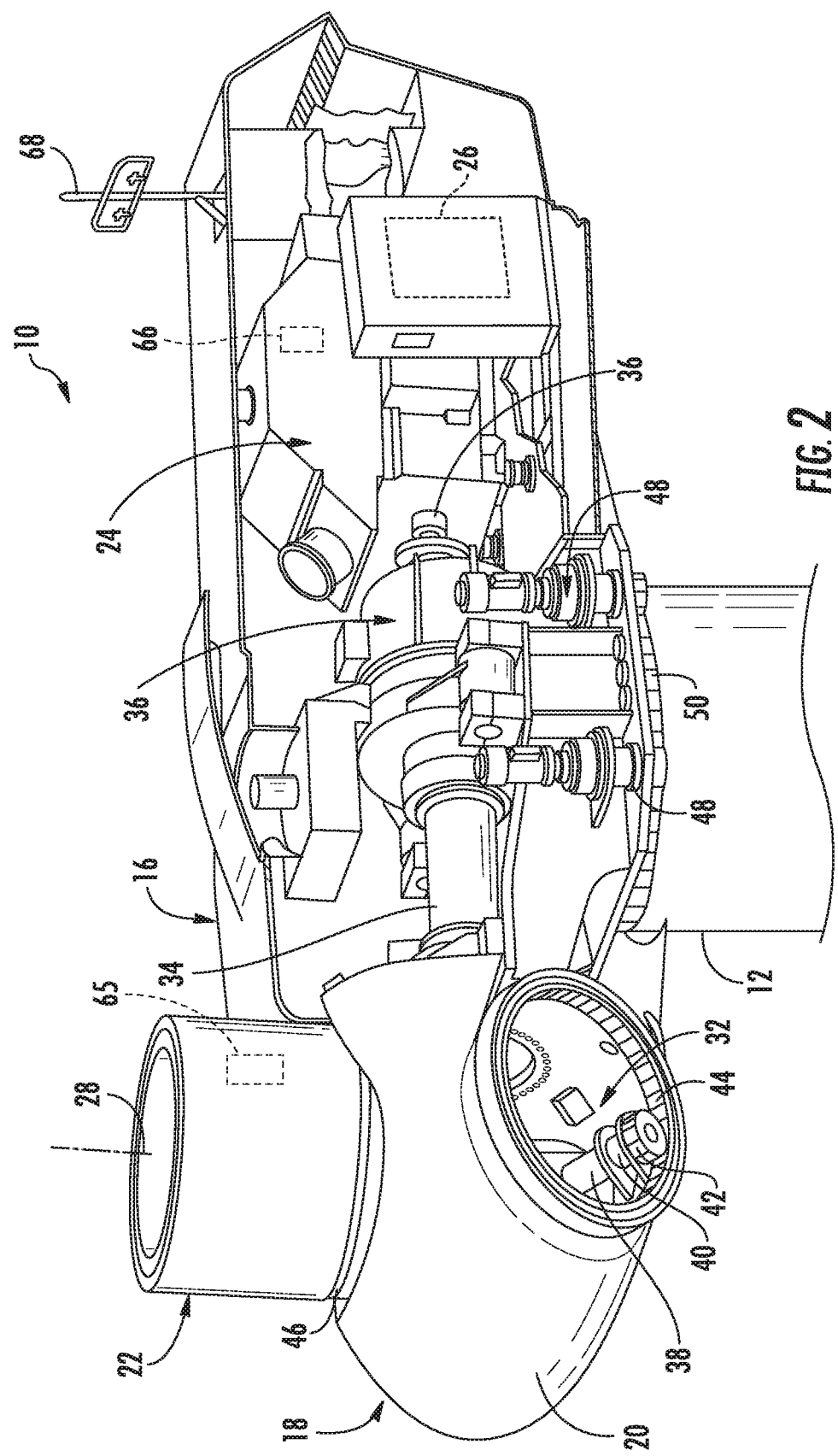
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 48 communicatively coupled to the controller 26, with each yaw drive mechanism(s) 48 being configured to change the angle of the nacelle 16 relative to the wind (e.g., by engaging a yaw bearing 50 of the wind turbine 10).

Still referring to FIG. 2, the wind turbine 10 may also include one or more sensors 65, 66, 68 for measuring operating and/or wind conditions of the wind turbine 10. For example, the sensors may include blade sensors 65 for measuring a pitch angle of one of the rotor blades 22 or for measuring a loading acting on one of the rotor blades 22; generator sensors 66 for monitoring the generator (e.g. torque, rotational speed, acceleration and/or the power output); and/or various wind sensors 68 for measuring various wind parameters (e.g. wind speed, wind direction, etc.). Further, the sensors 65, 66, 68 may be located near the ground of the wind turbine 10, on the nacelle 16, on a meteorological mast of the wind turbine 10, or any other location in the wind farm.

It should also be understood that any other number or type of sensors may be employed and at any location. For example, the sensors may be accelerometers, pressure sensors, strain gauges, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors 65, 66, 68 may, for example, be used to generate signals relating to the parameter being monitored, which can then be utilized by the controller 26 to determine the actual condition.

Referring back to FIG. 1, the wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Figure 3:
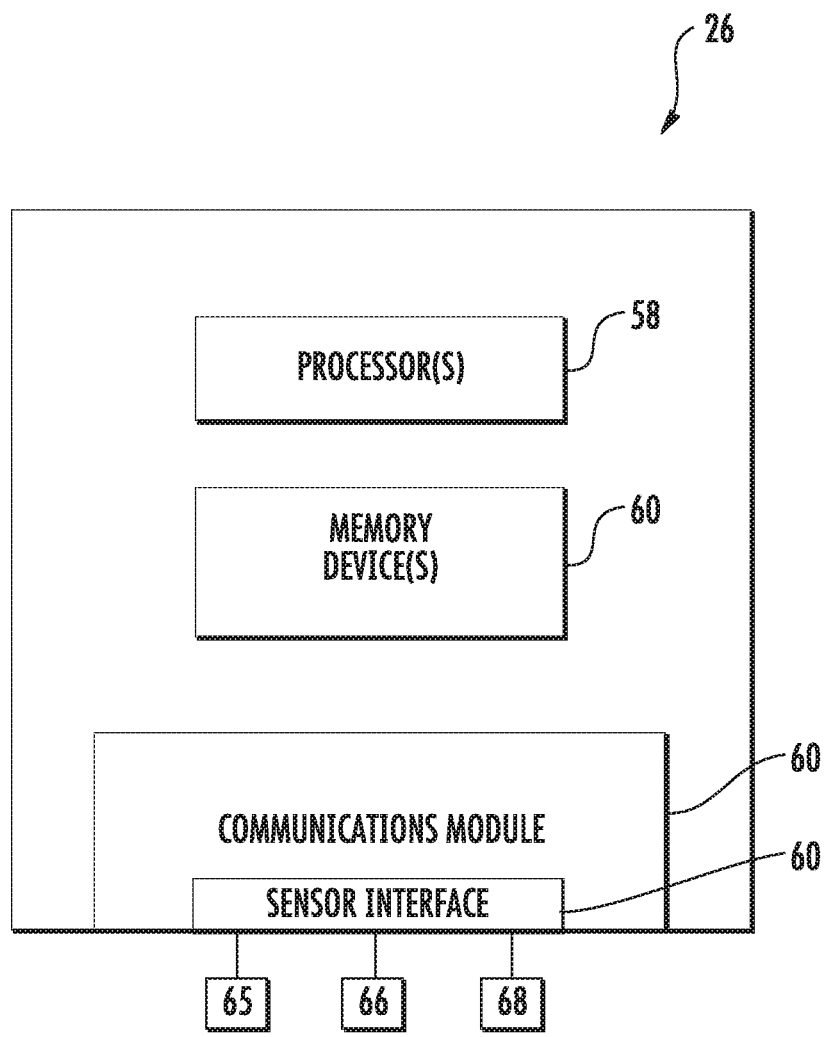
FIG. 3 illustrates a schematic view of one embodiment of a controller of a wind turbine according to the present disclosure.

Referring now to FIG. 3, a block diagram of one embodiment of suitable components that may be included within the controller 26 is illustrated in accordance with aspects of the present disclosure. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 60 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 68 to be converted into signals that can be understood and processed by the controller 26. Furthermore, it should be appreciated that the sensors 65, 66, 68 may be communicatively coupled to the communications module 62 using any suitable means. For example, as shown in FIG. 3, the sensors 65, 66, 68 are coupled to the sensor interface 64 via a wired connection. However, in alternative embodiments, the sensors 65, 66, 68 may be coupled to the sensor interface 64 via a wireless connection, such as by using any suitable wireless communications protocol known in the art. For example, the communications module 62 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 58 may be configured to receive one or more signals from the sensors 65, 66, 68.

Figure 4:
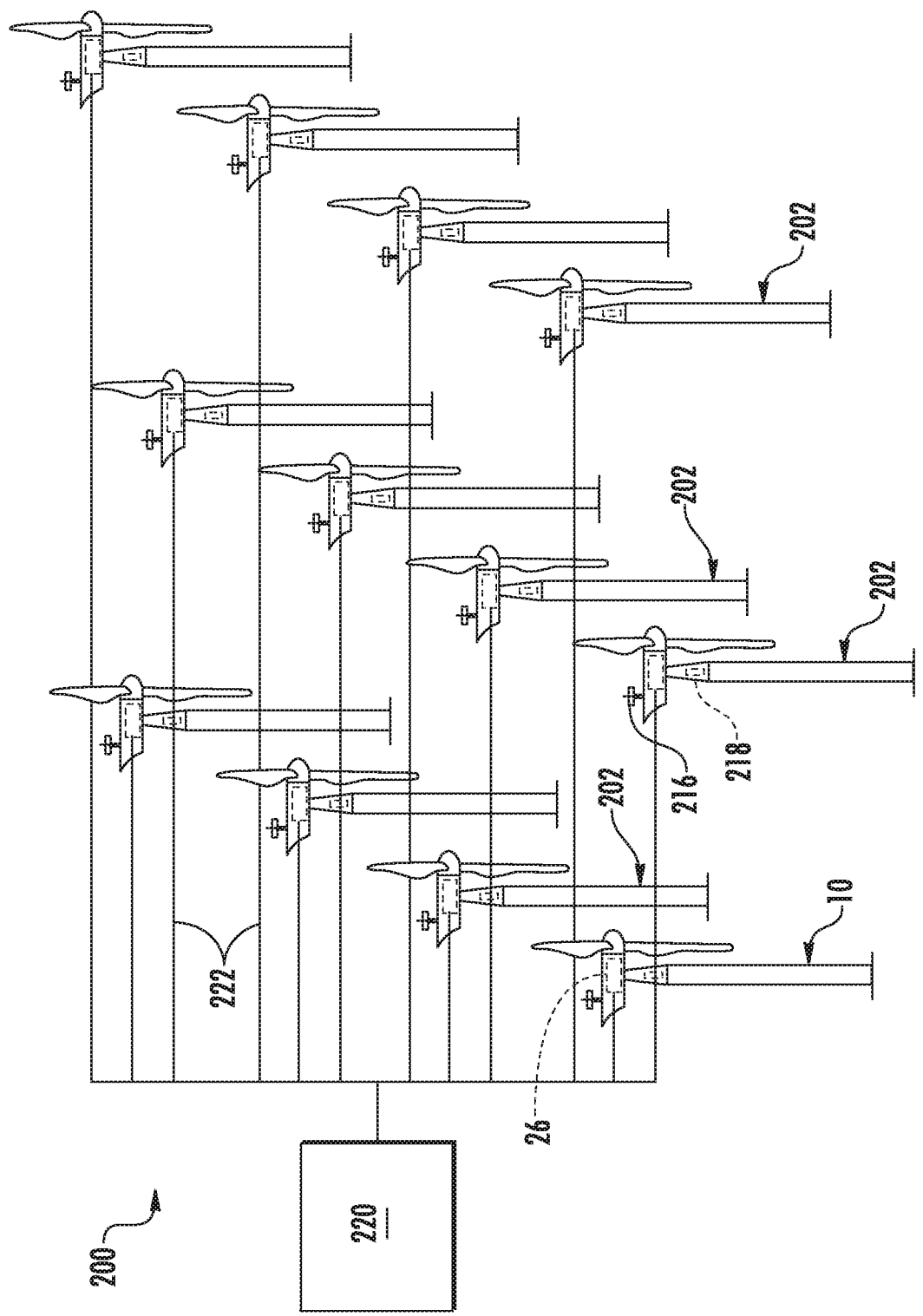
FIG. 4 illustrates a schematic view of one embodiment of a wind farm according to the present disclosure.

Referring now to FIG. 4, a wind farm 200 that is controlled according to the system and method of the present disclosure is illustrated. As shown, the wind farm 200 may include a plurality of wind turbines 202, including the wind turbine 10 described above, and a farm controller 220. For example, as shown in the illustrated embodiment, the wind farm 200 includes twelve wind turbines, including wind turbine 10. However, in other embodiments, the wind farm 200 may include any other number of wind turbines, such as less than twelve wind turbines or greater than twelve wind turbines. In one embodiment, the controller 26 of the wind turbine 10 may be communicatively coupled to the farm controller 220 through a wired connection, such as by connecting the controller 26 through suitable communicative links 222 (e.g., a suitable cable). Alternatively, the controller 26 may be communicatively coupled to the farm controller 220 through a wireless connection, such as by using any suitable wireless communications protocol known in the art. In addition, the farm controller 220 may be generally configured similar to the controllers 26 for each of the individual wind turbines 202 within the wind farm 200.

In several embodiments, one or more of the wind turbines 202 in the wind farm 200 may include a plurality of sensors for monitoring various operational data of the individual wind turbines 202 and/or one or more wind parameters of the wind farm 200. For example, as shown, each of the wind turbines 202 includes a wind sensor 216, such as an anemometer or any other suitable device, configured for measuring wind speeds or any other wind parameter. For example, in one embodiment, the wind parameters include information regarding at least one of or a combination of the following: a wind gust, a wind speed, a wind direction, a wind acceleration, a wind turbulence, a wind shear, a wind veer, a wake, SCADA information, or similar.

Figure 5:
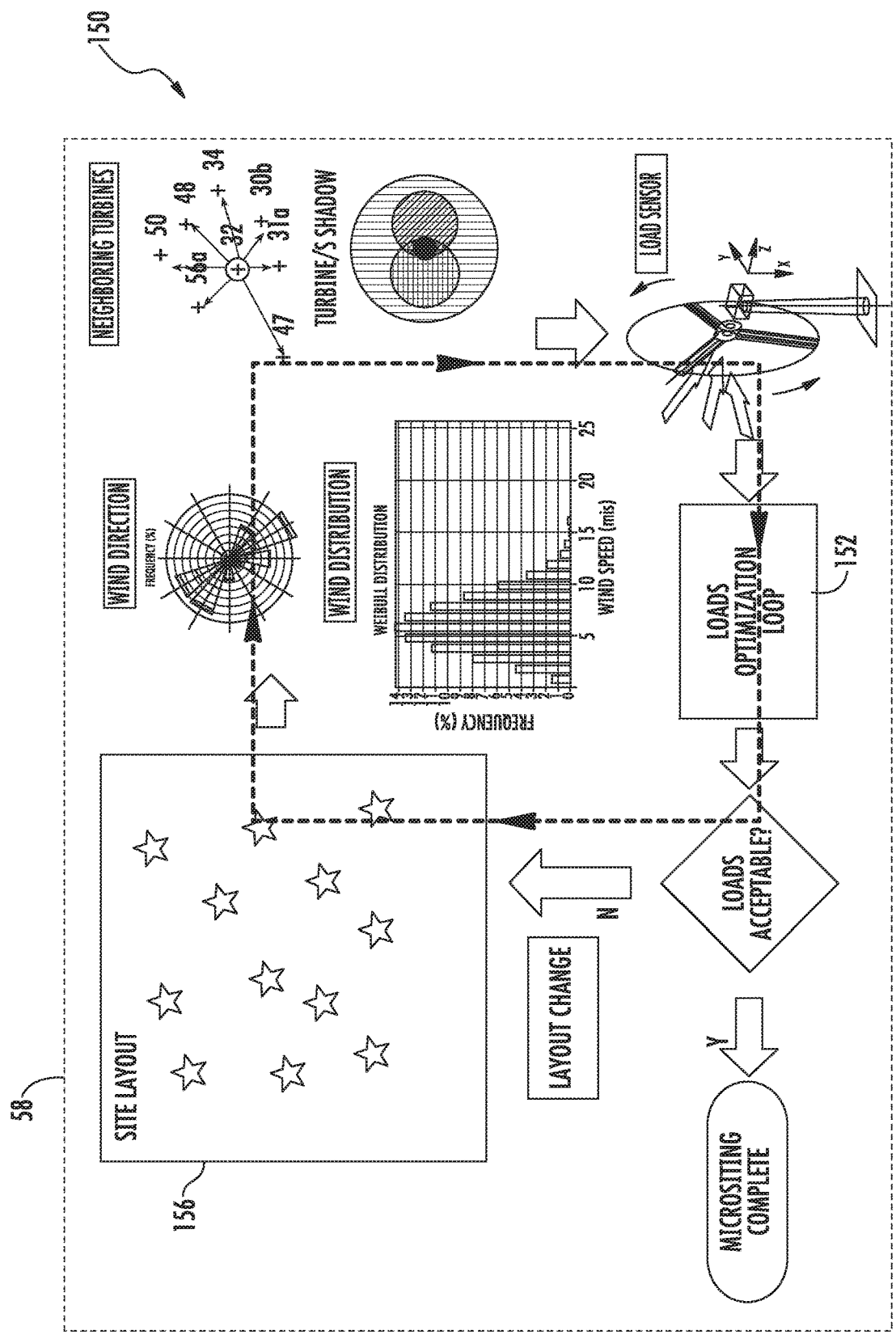
FIG. 5 illustrates a schematic diagram of one embodiment of a system for micrositing a wind farm for load optimization according to the present disclosure.
Figure 6:
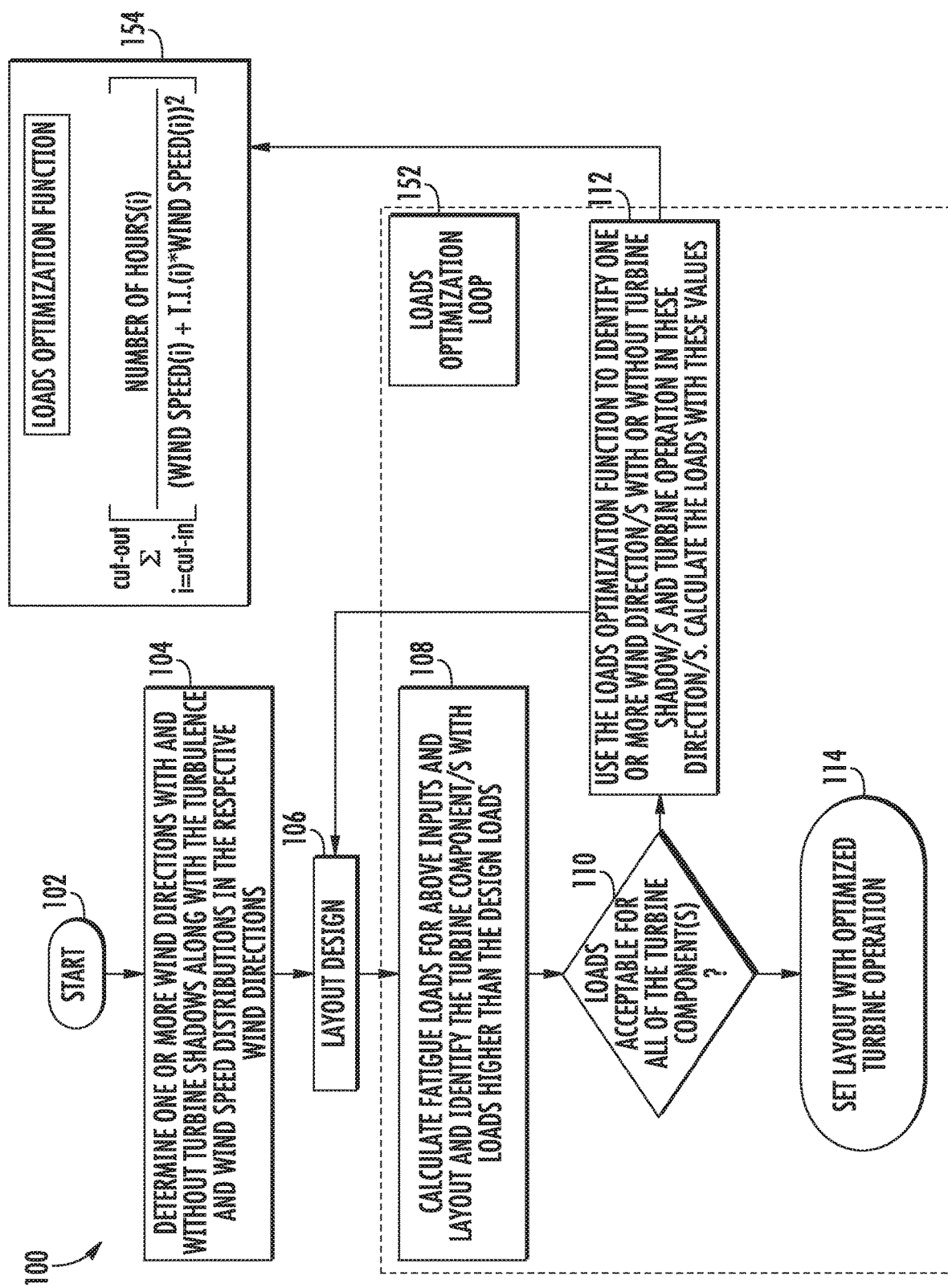
FIG. 6 illustrates a flow diagram of one embodiment of a method for micrositing a wind farm for load optimization according to the present disclosure.

Referring now to FIG. 5, a schematic diagram of one embodiment of a system 150 for micrositing a wind farm, e.g. the wind farm 200 of FIG. 4, is illustrated. As shown, the system 150 may be operated by one or more processors 58 of the controllers 26, 220. Further, as shown, the processor 58 includes a loads optimization loop 152 configured to implement a loads optimization function 154 (FIG. 6). For example, as shown in the illustrated embodiment of FIG. 6, the method 100 may start at 102. Further, as shown at 104, the method 100 may include determining one or more wind directions with and without turbine shadows along with turbulence and wind speed distributions in the respective wind directions. As shown at 106, the method 100 includes determining a predetermined layout design, e.g. based on the one or more wind directions with and without turbine shadows along with turbulence and wind speed distributions in the respective wind directions. As shown at 108, the method 100 may include calculating loads, e.g. fatigue loads, for the inputs (i.e. the wind directions with and without turbine shadows along with the turbulence and wind speed distributions in the respective wind directions) and the layout and identifying the turbine component(s) with loads higher than design loads.

In addition, as shown in FIG. 5, the method 100 may further include identifying sensor locations for load sensors on each of the wind turbines 202, neighboring turbines for each of the wind turbines 202, and/or a wind speed distribution of the wind farm 200. Thus, the method 100 may also include calculating the loads for each of the wind turbines 202 in the wind farm 200 as a function of sensor locations, the neighboring turbines, and/or the wind speed distribution (in addition to the wind directions with and without turbine shadows along with the turbulence and wind speed distributions in the respective wind directions). In another embodiment, the method 100 may include comparing cumulative loads in one or more wind directions with design loads of a turbine model of each of the wind turbines 202 in the wind farm 200 and calculating the loads of each of the wind turbines 202 as a function of the comparison.

Referring back to FIG. 6, as shown at 110, the method 100 includes determining whether the loads for all of the turbine components are acceptable. For example, as shown in FIG. 5, if the loads are acceptable, then the site layout with the optimized turbine operational parameters is provided to a user and the micrositing is complete. As shown at 112, if the loads exceed a predetermined threshold, then the loads optimization function 154 is utilized to identify one or more wind direction(s) with or without turbine shadow(s) along with an additional wind parameter (e.g. cut-in wind speed) in the wind directions. More specifically, as shown in the illustrated embodiment, the loads optimization function 154 may correspond to Equation (1) below:

$$\sum_{i=cut\ in}^{cut\ out} \frac{\text{Number of Hours}(i)}{(\text{Wind Speed}(i) + TI(i)(\text{Wind Speed}(i))^2} \quad \text{Equation (1)}$$

where TI is the turbulence intensity,
Number of Hours is the number of hours of operation at different wind directions,
Cut In is the cut in wind speed, and
Cut Out is the cut out wind speed.

The loads optimization loop 152 can rerun the loads optimization function 154 one or more times to identify updated wind direction(s) with or without turbine shadow(s) along with an additional wind parameter (e.g. cut-in wind speed) in the wind directions so as to ensure the loads are below a predetermined threshold. Thus, as shown in FIG. 5, the updated wind direction(s) with or without turbine shadow(s) along with an additional wind parameter in the wind directions may be applied to the predetermined site layout 156 so as to change the layout design for additional simulation. More specifically, the method 100 may include recalculating the loads for each of the wind turbines 202 to ensure the loads are below a predetermined threshold. In certain embodiments, the predetermined threshold may correspond to one or more design load values for one or more wind turbine components plus a safety factor. Once the loads are acceptable, as shown at 114, the site layout with optimized turbine operation is provided to a user for use in wind farm design.

Figure 7:
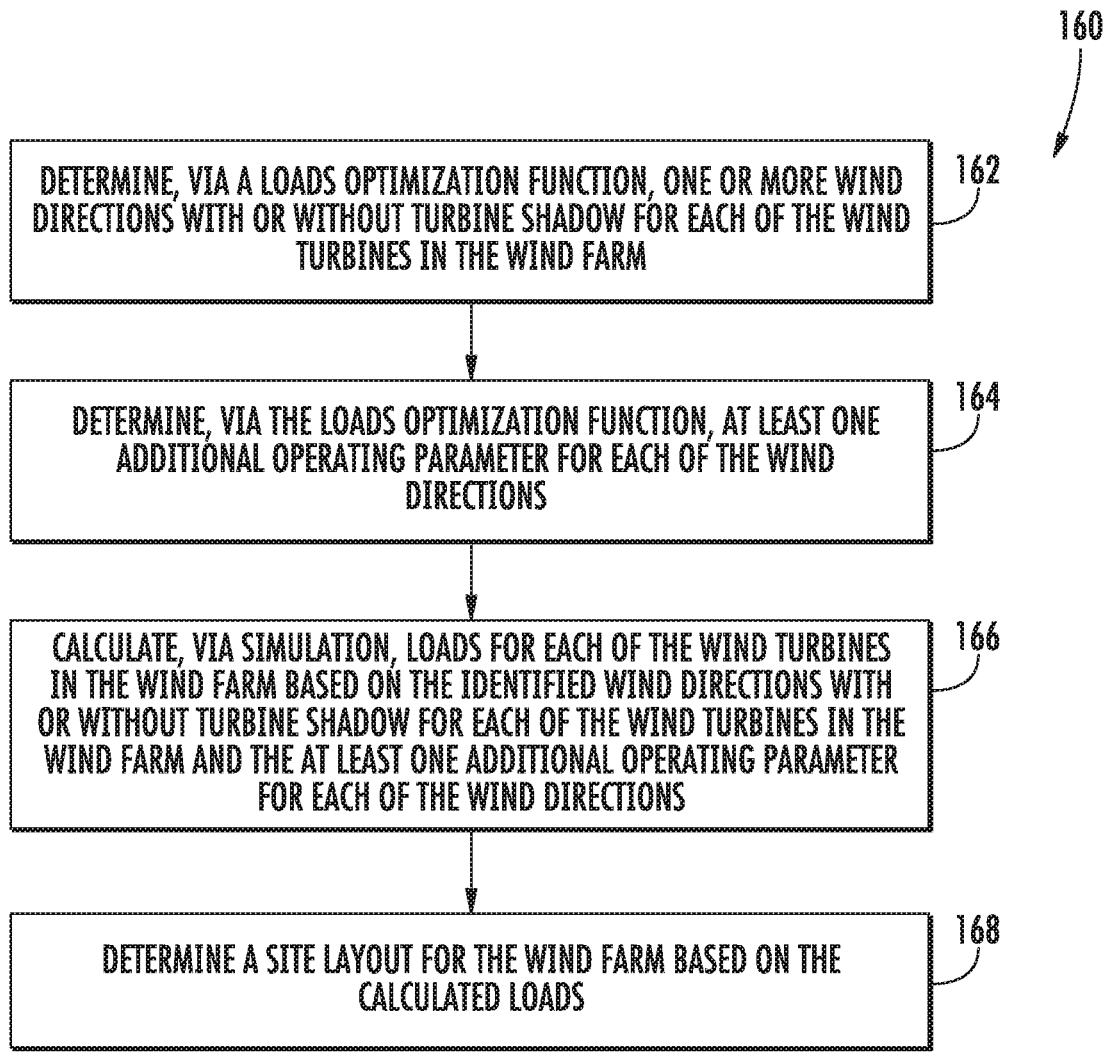
FIG. 7 illustrates a flow diagram of another embodiment of a method for micrositing a wind farm for load optimization according to the present disclosure; and, FIG. 8 illustrates a flow diagram of yet another embodiment of a method for micrositing a wind farm for load optimization according to the present disclosure.

Referring now to FIG. 7, a flow diagram of one embodiment of a method 160 for micrositing the wind farm 200 via a loads optimization function 154 is illustrated. As shown at 162, the method 160 may be configured to determine one or more wind directions with or without turbine shadow for each of the wind turbines 202 in the wind farm 200, e.g. as explained herein. As shown at 164, the method 160 includes determining at least one additional wind parameter, such as cut-in wind speed, for each of the wind directions. As shown at 166, the method 160 includes calculating, e.g. via computer simulation, loads for each of the wind turbines 202 in the wind farm 200 based on the identified wind directions with or without turbine shadow for each of the wind turbines 202 in the wind farm 200 and the at least one additional wind parameter for each of the wind directions. For example, in one embodiment, the additional wind parameter(s) may include, for example, a cutout wind speed or any other suitable wind condition. Further, as shown at 168, the method 160 includes determining a site layout for the wind farm 200 based on the calculated loads.

Figure 8:
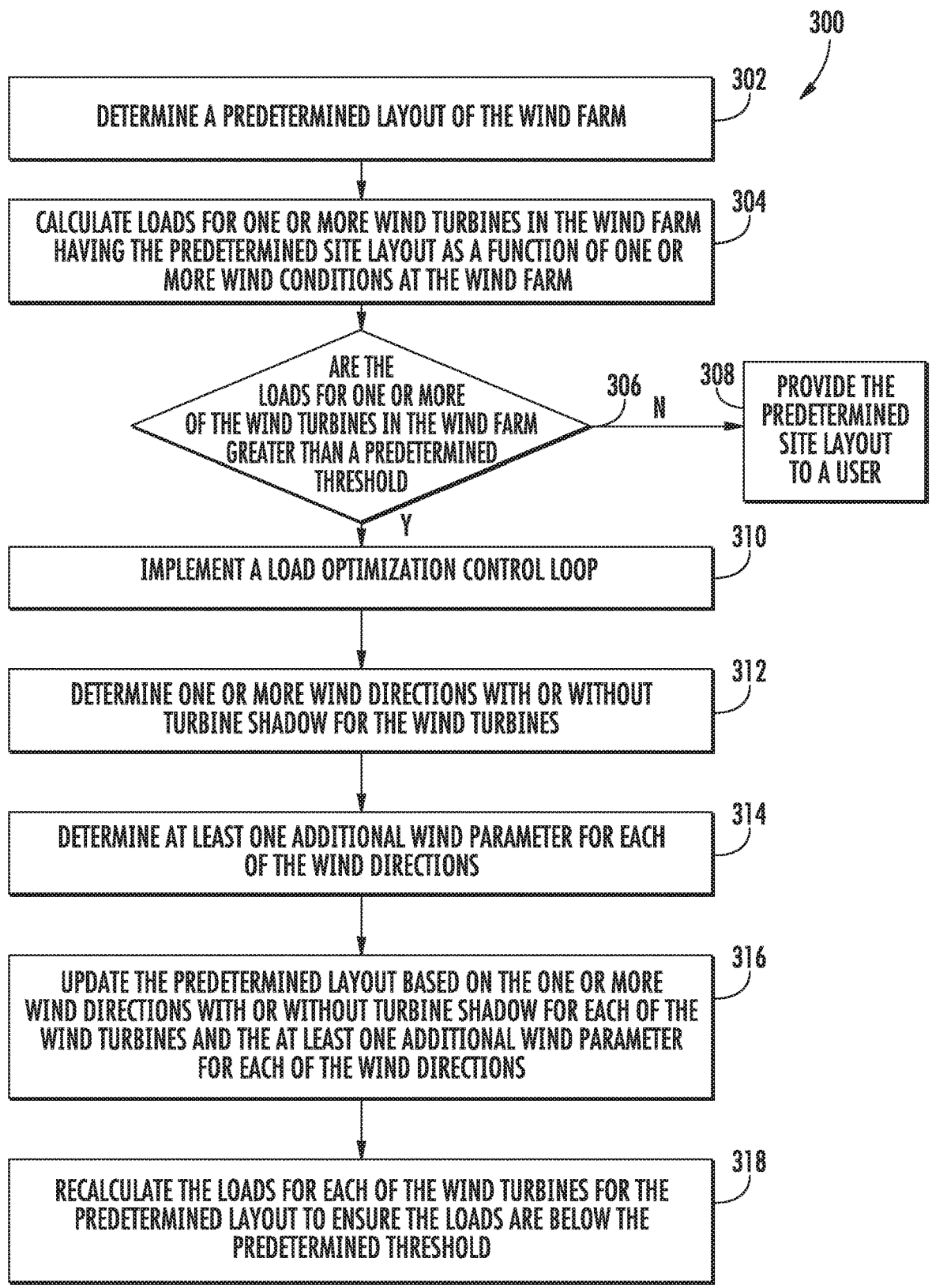

Referring now to FIG. 8, a flow diagram of another embodiment of a method 300 for micrositing the wind farm 200 is illustrated. As shown at 302, the method 300 includes defining a predetermined site layout of the wind farm 200. As shown at 304, the method 300 includes calculating loads for one or more wind turbines in the wind farm 200 having the predetermined site layout as a function of one or more wind conditions at the wind farm 200. In certain embodiments, the wind condition(s) may include at least one of wind direction, turbine shadow, turbulence intensity, or wind speed distributions in respective wind directions. As shown at 306 and 308, if the loads for all of the wind turbines 202 are less than a predetermined threshold, then the predetermined site layout is provided to a user. As shown at 310, if the loads for one or more of the wind turbines 202 are greater than a predetermined threshold, the method 300 includes implementing a load optimization control loop 152 that contains loads optimization function. More specifically, as shown at 312, the method 300 may include determining one or more wind directions with or without turbine shadow for each of the wind turbines 202 in the wind farm 200. Further, as shown at 314, the method 300 may include determining at least one additional wind parameter for each of the wind directions. As shown at 316, the method 300 may include updating the predetermined layout based on the one or more wind directions with or without turbine shadow for each of the wind turbines 202 and the at least one additional wind parameter for each of the wind directions. As shown at 318, the method 300 may include recalculating the loads for each of the wind turbines 202 in the wind farm 200 for the predetermined layout to ensure the loads are below a predetermined threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of maximizing power output of a wind farm having a plurality of wind turbines, the method comprising:
    (a) receiving a predetermined site layout for the wind farm;
    (b) determining a number of hours of operation at different wind directions with or without turbine shadow for each of the wind turbines in the wind farm for the predetermined site layout;
    (c) receiving a wind speed and a turbulence intensity for each of the wind directions;
    (d) calculating, via computer-implemented simulation, loads for each of the plurality of wind turbines in the wind farm as a function of the number of hours of operation at different wind directions with or without turbine shadow for each of the wind turbines in the wind farm, the wind speed, and the turbulence intensity for each of the wind directions;
    (e) comparing the calculated loads to a predetermined threshold;
    (f) if the calculated loads are below the predetermined threshold, approving of the predetermined site layout; and
    (g) after installation of the wind farm according to the predetermined site layout, controlling one or more turbine components of the plurality of wind turbines in the wind farm so as to maximize the power output of the wind farm, the various components comprising at least of a generator, a power converter, a pitch system, one or more brakes, or a yaw mechanism.

2. The method of claim 1, further comprising, if the calculated loads are at or above the predetermined threshold, providing a different site layout for the wind farm and repeating steps (b) through (f).

3. The method of claim 1, wherein the predetermined threshold corresponds to one or more design load values for one or more wind turbine components plus a safety factor.

4. The method of claim 1, further comprising identifying at least one of the following: one or more sensor locations for load sensors on each of the wind turbines, neighboring turbines for each of the wind turbines, or a wind speed distribution of the wind farm.

5. The method of claim 4, further comprising calculating the loads for each of the plurality of wind turbines in the wind farm as a function of at least one of the load sensors, the neighboring turbines, and/or the wind speed distribution.

6. The method of claim 1, further comprising comparing cumulative loads in one or more wind directions with design loads of a turbine model of each of the plurality of wind turbines in the wind farm and calculating the loads of each of the plurality of wind turbines in the wind farm as a function of the comparison.

7. A system for maximizing power output of a wind farm having a plurality of wind turbines, the system comprising:
a controller comprising at least one processor, the processor comprising a loads optimization loop stored therein, the loads optimization loop configured to implement a loads optimization function, the loads optimization function comprising:
receiving a wind speed and a turbulence intensity for each of the wind directions;
determining a number of hours of operation at different wind directions with or without turbine shadow for each of the wind turbines in the wind farm for the predetermined site layout;
receiving at least one additional wind parameter for each of the wind directions;
calculating loads for each of the wind turbines in the wind farm as a function of the number of hours of operation at different wind directions with or without turbine shadow for each of the wind turbines in the wind farm, the wind speed, and the turbulence intensity for each of the wind directions;
comparing the calculated loads to a predetermined threshold; and
if the calculated loads are below the predetermined threshold, approving of the predetermined site layout for installation;
the processor further configured to perform one or more additional operations, the one or more additional operations comprising:
after installation of the wind farm according to the predetermined site layout, controlling one or more turbine components of the plurality of wind turbines in the wind farm, so as to maximize the power output of the wind farm, the various components comprising at least of a generator, a power converter, a pitch system, one or more brakes, or a yaw mechanism.

8. The system of claim 7, wherein the one or more wind conditions comprise at least one of wind direction, turbine shadow, turbulence intensity, or wind speed distributions in respective wind directions.

9. The system of claim 7, further comprising, if the calculated loads are at or above the predetermined threshold, providing a different site layout for the wind farm and repeating steps (b) through (f).

10. The system of claim 7, further comprising identifying at least one of the following: one or more sensor locations for load sensors on each of the wind turbines, neighboring turbines for each of the wind turbines, or a wind speed distribution of the wind farm.

11. The system of claim 10, further comprising calculating the loads for each of the wind turbines in the wind farm as a function of at least one of the sensor locations, the neighboring turbines, or the wind speed distribution.

12. The system of claim 7, further comprising comparing cumulative loads in one or more wind directions with design loads of a turbine model of each of the wind turbines in the wind farm and calculating the loads of each of the wind turbines in the wind farm as a function of the comparison.

13. The system of claim 7, wherein the predetermined threshold corresponds to one or more design load values for one or more wind turbine components plus a safety factor.

* * * * *